United States Patent
Mastro et al.

(10) Patent No.: US 11,441,443 B2
(45) Date of Patent: Sep. 13, 2022

(54) SYSTEMS AND METHODS FOR MONITORING AND CONTROLLING A GAS TURBINE ENGINE

(71) Applicant: UNITED TECHNOLOGIES CORPORATION, Farmington, CT (US)

(72) Inventors: Jacob Peter Mastro, Glastonbury, CT (US); Martin J Walsh, Farmington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 49 days.

(21) Appl. No.: 16/433,939

(22) Filed: Jun. 6, 2019

(65) Prior Publication Data
US 2020/0386117 A1  Dec. 10, 2020

(51) Int. Cl.
*F01D 21/00* (2006.01)
*F01D 19/00* (2006.01)
(Continued)

(52) U.S. Cl.
CPC ............. *F01D 19/00* (2013.01); *F01D 15/12* (2013.01); *F01D 21/003* (2013.01); *F01D 21/14* (2013.01);
(Continued)

(58) Field of Classification Search
CPC .. F01D 25/18; F05D 2260/98; F16N 2210/02; F16N 29/00; F16N 2210/14; F02C 7/06; G01B 7/105
See application file for complete search history.

(56) References Cited

U.S. PATENT DOCUMENTS

| 3,129,580 A | 4/1964 | Furey |
| 3,153,403 A | 10/1964 | Dobbs |
| (Continued) | | |

FOREIGN PATENT DOCUMENTS

| EP | 0159742 | 10/1985 |
| EP | 1510658 | 2/2005 |
| (Continued) | | |

OTHER PUBLICATIONS

European Patent Office, European Search Report dated Sep. 14, 2020 in Application No. 20178375.0.
(Continued)

*Primary Examiner* — Courtney D Heinle
*Assistant Examiner* — Andrew J Marien
(74) *Attorney, Agent, or Firm* — Snell & Wilmer L.L.P.

(57) ABSTRACT

A method for controlling a gas turbine engine includes receiving, by a signal processor from a sensor, an operating condition of the gas turbine engine and determining, by the signal processor, whether the operating condition is within an acceptable threshold. In response to the operating condition being outside the acceptable threshold, the method includes restricting, by the signal processor, a subsequent engine restart of the gas turbine engine. Restricting the subsequent engine restart of the gas turbine engine may comprise preventing the subsequent restart. In various embodiments, restricting the subsequent engine restart of the gas turbine engine comprises limiting a subsequent operating state of the gas turbine engine after the subsequent restart.

8 Claims, 8 Drawing Sheets

(51) Int. Cl.
    *F01D 15/12*     (2006.01)
    *F01D 21/14*     (2006.01)
    *G01B 7/06*     (2006.01)

(52) U.S. Cl.
    CPC ............ *G01B 7/06* (2013.01); *F05D 2220/32* (2013.01); *F05D 2260/40311* (2013.01); *F05D 2260/85* (2013.01); *F05D 2260/98* (2013.01)

(56) References Cited

U.S. PATENT DOCUMENTS

| | | | |
|---|---|---|---|
| 4,074,575 A * | 2/1978 | Bergman | F04D 15/0263 |
| | | | 374/142 |
| 4,139,244 A | 2/1979 | Guerguerian | |
| 4,167,172 A | 9/1979 | Bassoli et al. | |
| 4,511,837 A | 4/1985 | Vermeiren et al. | |
| 7,552,799 B2 | 6/2009 | Sherrington | |
| 7,581,434 B1 | 9/2009 | Discenzo et al. | |
| 8,020,665 B2 | 9/2011 | Sheridan | |
| 8,172,716 B2 | 5/2012 | McCune | |
| 10,133,257 B2 | 11/2018 | Hedin | |
| 2003/0047386 A1 * | 3/2003 | Sherrington | F16N 29/02 |
| | | | 184/7.4 |
| 2003/0047389 A1 | 3/2003 | Yokoyama | |
| 2003/0098691 A1 | 5/2003 | Matsuyama et al. | |
| 2010/0331139 A1 * | 12/2010 | McCune | F02C 7/36 |
| | | | 475/331 |
| 2010/0331140 A1 | 12/2010 | McCune | |
| 2012/0318071 A1 * | 12/2012 | Biehl | G01L 5/0019 |
| | | | 73/862.68 |
| 2017/0102292 A1 | 4/2017 | Mastro et al. | |
| 2017/0114662 A1 | 4/2017 | Mastro et al. | |
| 2018/0201386 A1 * | 7/2018 | Strauss | B64D 45/00 |
| 2019/0121344 A1 | 4/2019 | Cella et al. | |

FOREIGN PATENT DOCUMENTS

| | | | |
|---|---|---|---|
| EP | 1701049 | 9/2006 | |
| EP | 2299159 | 3/2011 | |
| EP | 3156759 | 4/2017 | |
| EP | 3163049 | 5/2017 | |
| GB | 1601703 | 11/1981 | |
| JP | 57023808 | * 2/1982 | .............. G01B 7/06 |
| JP | 61149611 | * 12/1984 | .............. F16C 17/24 |
| JP | 61149611 | 7/1986 | |
| JP | 2008185339 | 8/2008 | |
| WO | 2017015341 | 1/2017 | |
| WO | 2018028920 | 2/2018 | |

OTHER PUBLICATIONS

Theoretical Evaluation of Capacitance, Capacitive Reactance, Resistance and Their Effects on Performance of Hydrodynamic Journal Bearings, H. Prashad, vol. 113, Oct. 1991.
Extended European Search Report dated Mar. 20, 2017 in European Application No. 16192439.4.
USPTO, Final Rejection dated Jan. 24, 2019 in U.S. Appl. No. 14/878,893.
USPTO, Non-Final Rejection dated Jul. 25, 2018 in U.S. Appl. No. 14/878,893.
USPTO, Advisory Action dated Jun. 27, 2018 in U.S. Appl. No. 14/878,893.
USPTO, Final Rejection dated Apr. 19, 2018 in U.S. Appl. No. 14/878,893.
USPTO, First Action Interview—Office Action dated Oct. 25, 2017 in U.S. Appl. No. 14/878,893.
USPTO, Preinterview First Office Action dated Aug. 11, 2017 in U.S. Appl. No. 14/878,893.
USPTO, Requirement for Restriction/ Election dated Mar. 8, 2017 in U.S. Appl. No. 14/878,893.

* cited by examiner

SYSTEMS AND METHODS FOR MONITORING AND CONTROLLING A GAS TURBINE ENGINE

FIELD

The present disclosure relates to gas turbine engines, and more specifically, to systems and methods for monitoring and controlling the operation of gas turbine engines.

BACKGROUND

Aircraft gas turbine engines may utilize an oil-lubricated journal bearing within an epicyclic star gear or planetary gear system in either a turbofan or turboprop configuration. For the reliable performance of the oil-lubricated journal bearing, an adequate amount of oil (i.e., a minimum lubricant film thickness) is used to separate the two bearing surfaces of the journal bearing under relative motion. Conventional methods for monitoring lubrication film thickness are indirect methods, such as particle detection or measurements of thermal output. These conventional methods do not permit direct measurement of the lubrication film thickness of a journal bearing in an epicyclic gear system of an operating gas turbine engine in real time. Further, conventional methods and systems for monitoring and controlling gas turbine engines often trigger an alert or other notification, which can be ignored or dismissed without resolving or at least addressing the underlying issue.

SUMMARY

Disclosed herein, according to various embodiments, is a method for controlling a gas turbine engine in response to a thickness of a lubricant film in a journal bearing of an epicyclic gear system of the gas turbine engine. The method may include receiving, by a signal processor from a sensor, an electrical property measurement across the lubricant film. The method may also include converting, by the signal processor, the electrical property measurement into a calculated lubricant film thickness measurement and determining, by the signal processor, whether the calculated lubricant film thickness measurement is below a predetermined minimum lubricant film thickness. Still further, the method includes, in response to the calculated lubricant film thickness measurement being below the predetermined minimum lubricant film thickness, restricting, by the signal processor, a subsequent engine restart of the gas turbine engine.

In various embodiments, restricting the subsequent engine restart of the gas turbine engine comprises preventing the subsequent restart. In various embodiments, restricting the subsequent engine restart of the gas turbine engine comprises limiting a subsequent operating state of the gas turbine engine after the subsequent restart. For example, the subsequent operating state may be an operating speed of the gas turbine engine. In various embodiments, limiting the subsequent operating state of the gas turbine engine comprises preventing the gas turbine engine from operating above idle after the subsequent restart.

In various embodiments, the method further comprises measuring, by an electrical circuit, an electrical property across the lubricant film to obtain the electrical property measurement. Measuring the electrical property may include measuring at least one of bearing resistance, bearing capacitance, impedance, or capacitive reactance. The method may include comprising comparing the electrical property measurement with a reference measurement for the electrical property and detecting contact of the bearing surfaces if the electrical property measurement comprising a bearing resistance is about zero. In various embodiments, converting the electrical property measurement into the calculated lubricant film thickness measurement comprises calculating a lubricant film thickness from the electrical property measurement.

Also disclosed herein, according to various embodiments, is a system for controlling a gas turbine engine in response to a thickness of a lubricant film in a journal bearing of an epicyclic gear system of the gas turbine engine. The system may include a first electrical lead having a first end in communication with a first conductive element on a static side of the journal bearing and a second end connected to a signal processor. The system may also include a second electrical lead having a first lead end connected to a second conductive element on a rotating side of the journal bearing and a second lead end connected to the signal processor to complete an electrical circuit, the signal processor electrically connected to the first electrical lead and the second electrical lead. The signal processor is configured to, according to various embodiments, measure an electrical property of the electrical circuit to obtain an electrical property measurement and compare the electrical property measurement with a reference measurement for the electrical property and detect contact of the bearing surfaces if the electrical property measurement comprising a bearing resistance is about zero. The signal processor may further be configured to convert the electrical property measurement into a calculated lubricant film thickness measurement and compare the calculated lubricant film thickness measurement with a predetermined minimum lubricant film thickness. Still further, the signal processor may restrict a subsequent engine restart of the gas turbine engine if the calculated lubricant film thickness measurement is less than the predetermined minimum lubricant film thickness.

In various embodiments, the epicyclic gear system comprises a star gear system or a planetary gear system. The first conductive element on the static side of the journal bearing may be a journal pin. The second conductive element on the rotating side of the journal bearing may comprise a star gear, a ring gear, a sun gear, an input coupling, or a fan shaft. The electric property measurement comprises at least one of bearing resistance, bearing capacitance, capacitive reactance, or impedance, according to various embodiments.

Also disclosed herein, according to various embodiments, is a method for controlling a gas turbine engine. The method may include receiving, by a signal processor from a sensor, an operating condition of the gas turbine engine and determining, by the signal processor, whether the operating condition is within an acceptable threshold. In response to the operating condition being outside the acceptable threshold, the method may include restricting, by the signal processor, a subsequent engine restart of the gas turbine engine.

Restricting the subsequent engine restart of the gas turbine engine may comprise preventing the subsequent restart. In various embodiments, restricting the subsequent engine restart of the gas turbine engine comprises limiting a subsequent operating state of the gas turbine engine after the subsequent restart. The subsequent operating state may be an operating speed of the gas turbine engine. In various embodiments, limiting the subsequent operating state of the gas turbine engine comprises preventing the gas turbine engine from operating above idle after the subsequent restart. In various embodiments, the operating condition of the gas turbine engine comprises at least one of: a temperature from a temperature sensor, a pressure from a pressure sensor, a position from a position sensor, a vibratory response from a vibration sensor, a rotating speed from a speed sensor, a lubricant thickness from a lubricant film thickness sensor, and a sensor status.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with the present inventions and the teachings herein. Thus, the detailed description herein is presented for purposes of illustration only and not of limitation. The scope of the present inventions is defined by the appended claims.

Various embodiments are directed to systems and methods for monitoring the lubricant film thickness of a journal bearing in an epicyclic gear system of a gas turbine engine. More particularly, the systems and methods according to various embodiments permit real-time measurement of the lubricant film thickness between the interfacing bearing surfaces of the journal bearing in the epicyclic gear system, thereby maintaining performance and operability of the epicyclic gear system and gas turbine engine. Monitoring also helps ensure that engine safety is maintained.

Figure 1:
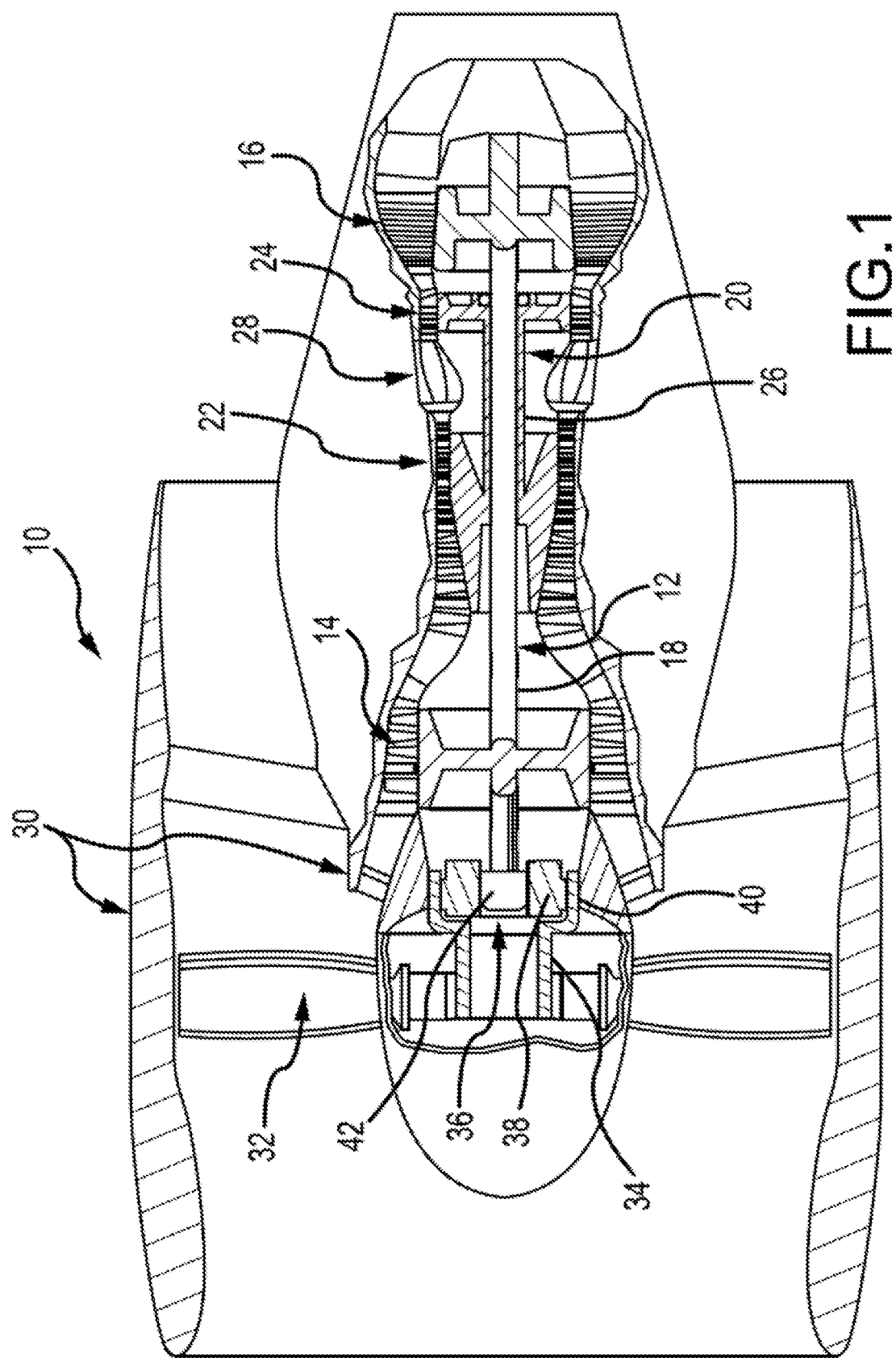
FIG. 1 is a schematic cross sectional view of an aircraft gas turbine engine with an epicyclic gear system comprising a gear train, according to various embodiments.

FIG. 1 is a schematic cross-sectional view of an exemplary gas turbine engine 10 in which a system according to various embodiments may be used. Gas turbine engine 10 may include a low pressure unit 12 (that includes low pressure compressor 14 and low pressure turbine 16 connected by low pressure shaft 18, high pressure unit 20 (that includes high pressure compressor 22 and high pressure turbine 24 connected by high pressure shaft 26), combustor 28, nacelle 30, fan 32, fan shaft 34, and epicyclic gear system 36. The epicyclic gear system may be a fan drive gear system (FDGS). A fan drive gear system (FDGS) follows the fan shaft but separates or decouples the fan 32 from the low pressure unit 12. The fan 32 rotates at a slower speed and the low pressure unit 12 operates at a higher speed. This allows each of the fan 32 and the low pressure unit 12 to operate with improved efficiency. While gas turbine engine 10 has been described, it is to be understood that the methods and systems according to various embodiments as herein described may be used in gas turbine engines having other configurations.

As shown in the exemplary gas turbine engine of FIG. 1, low pressure unit 12 is coupled to fan shaft 34 via the epicyclic gear system 36. Epicyclic gear system 36 generally includes an epicyclic gear train including a star gear 38, a ring gear 40, and sun gear 42. As hereinafter described, the epicyclic gear train may be configured as a star gear system 37a (e.g., FIG. 4) or a planetary gear system 37b (e.g., FIG. 5), as hereinafter described in more detail. Epicyclic gear trains reduce or increase the rotational speed between two rotating shafts or rotors. In response to rotation of low pressure unit 12, epicyclic gear system 36 causes the fan shaft 34 to rotate at a slower rotational velocity than that of low pressure unit 12, but in the opposite direction.

Figure 2:
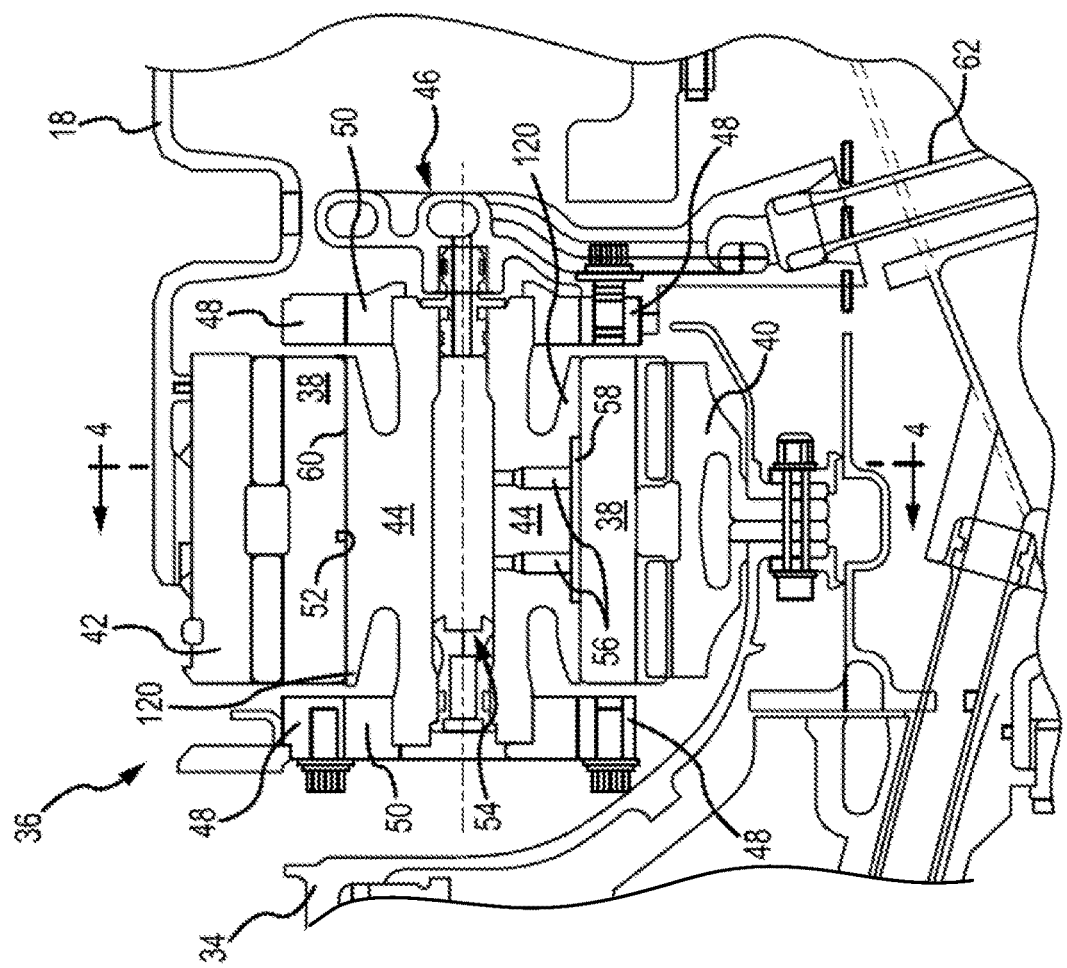
FIG. 2 is a schematic cross sectional view of the epicyclic gear system of FIG. 1, according to various embodiments.
Figure 4:
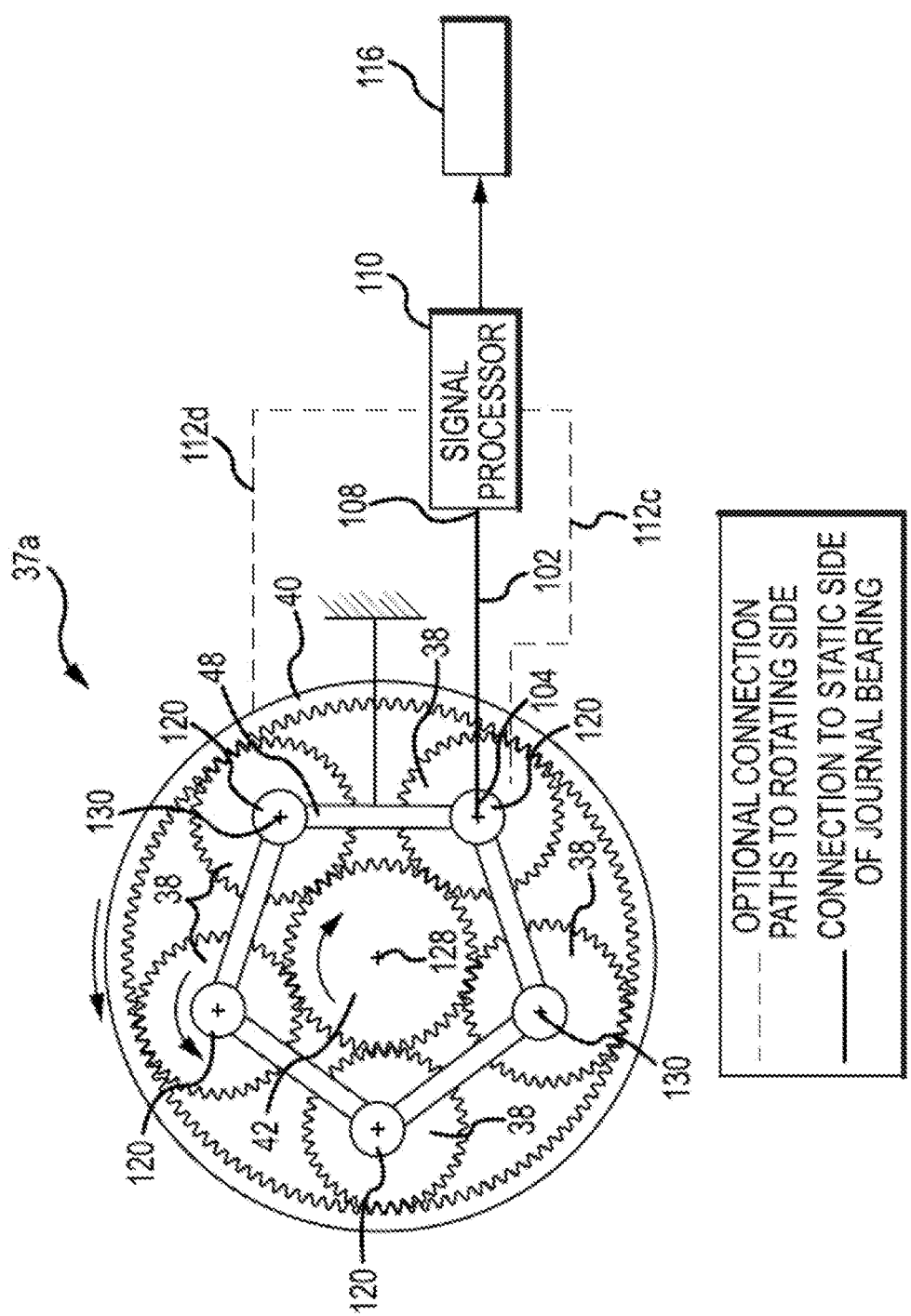
FIG. 4 is a diagrammatic view of the gear train of FIG. 1 configured as a star gear system taken along section 4-4 of FIG. 2, illustrating by a solid line location where a first electrical circuit lead may be connected to a static side of the journal bearing and by dotted lines where a second electrical circuit lead may be connected to a rotating side of the journal bearing for monitoring the lubricant film thickness of the journal bearing, according to various embodiments.
Figure 5:
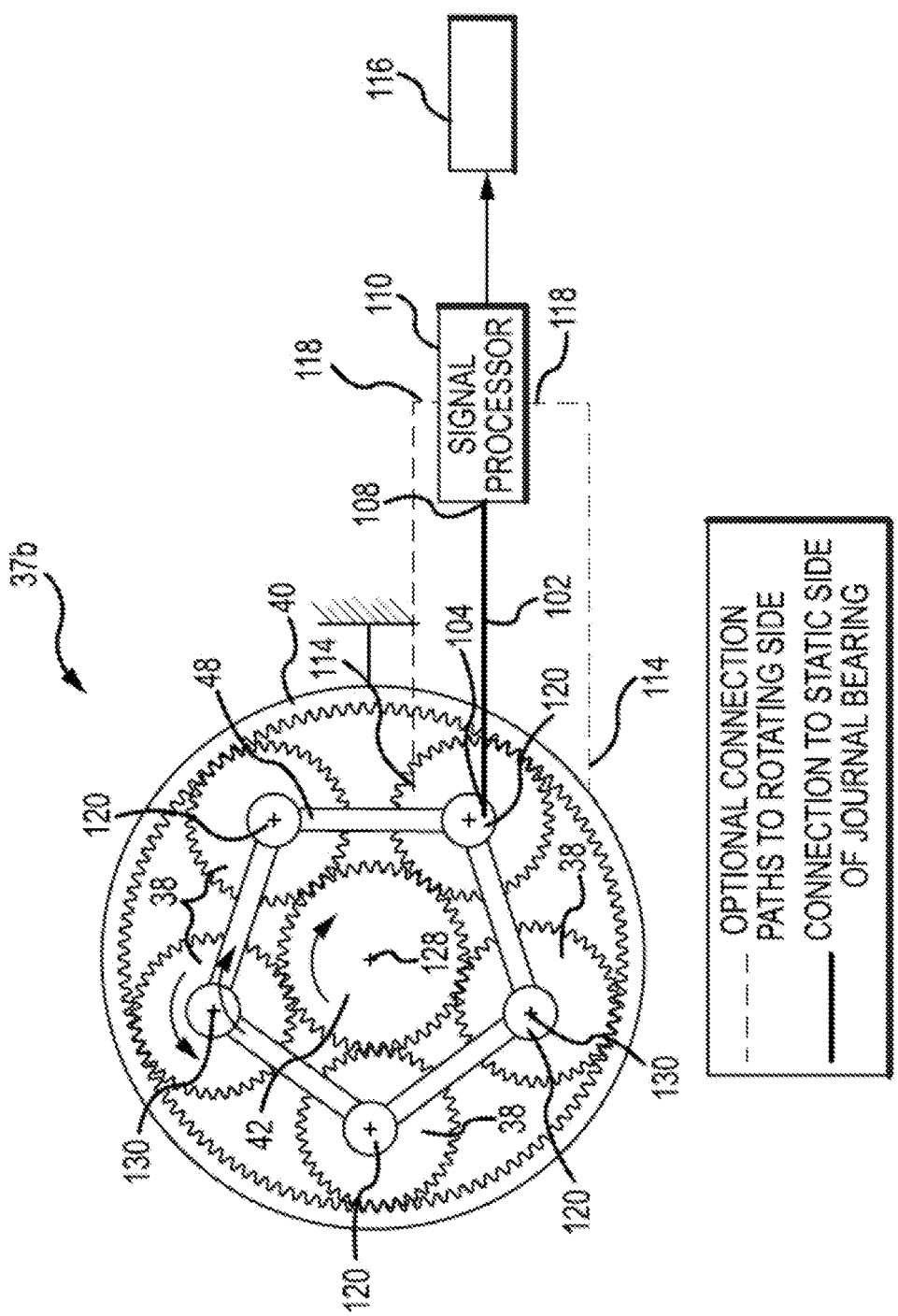
FIG. 5 is a diagrammatic view similar to FIG. 4 illustrating a gear train configured as a planetary gear system, illustrating by dotted line locations where the first electrical circuit lead may be connected to the rotating side of the journal bearing and a solid line where a second electrical circuit lead may be connected to the static side of the journal bearing for monitoring the lubricant film thickness of the journal bearing, according to various embodiments.

Still referring to FIG. 1, the sun gear 42 is attached to and rotates with low pressure shaft 18. Sun gear 42 is rotatably mounted on low pressure shaft 18. Ring gear 40 is connected to fan shaft 34 which turns at the same speed as fan 32. Star gear 38 is enmeshed between sun gear 42 and ring gear 40 such that star gear 38 rotates in response to rotation of sun gear 42. Star gear 38 is rotatably mounted on a stationary gear carrier 48 by a stationary journal pin 120 (FIGS. 2, 4, and 5). The star gear 38 circumscribes the journal pin 120. The journal pin 120 is disposed inside of the at least one rotatable star gear and connected to the gear carrier 48. The journal pins 120 inside each of the star gears (FIGS. 4 and 5) are all supported by the gear carrier 48. The gear carrier 48 interconnects the journal pins 120 with each other and, by doing so, also interconnects the star gears 38 to each other (see, FIGS. 4 and 5). The outer radial surface (i.e., interface surface 52) of journal pin 120 interfaces with the inner surface 60 of the star gear 38. Thus, the interface surface 52 of journal pin 120 and the inner surface 60 of the star gear 38 are interfacing bearing surfaces. A thin, replenishable film of lubricant flows from a distribution recess 58 between each star gear 38 and its journal pin 120 to support the star gear. This arrangement is referred to as a journal bearing 44.

FIG. 2 is a cross-sectional view of the epicyclic gear system 36 taken through only a single star gear 38. Epicyclic gear system 36, however, includes multiple star gears arranged circumferentially around the sun gear 42 as shown in FIGS. 4 and 5. In addition to star gear 38, ring gear 40, and sun gear 42, epicyclic gear system 36 includes the journal pin 120, lubricant manifold 46, the gear carrier 48, and end caps 50. Gear carrier 48 is stationarily mounted within gas turbine engine 10 (FIG. 1) to the non-rotating engine case walls radially outboard of epicyclic gear system 36. Gear carrier 48 has two generally interfacing faces that support the ends of the stationary journal bearing 44. The gear carrier 48 is disposed adjacent the rotatable star gear 38 and sun gear 42. Journal pin 120 includes axial passage 54 and radial passages 56. Radial passages 56 fluidly connect to the distribution recess 58. Lubricant manifold 46 is connected to feed tube 62. A lubricant manifold 46 is disposed adjacent to journal bearing 44 and is fluidly connected thereto. Axial passage 54 is fluidly connected to lubricant manifold 46. Lubricant manifold 46 is fed pressurized liquid lubricant (typically oil) from other components of the gas turbine engine via feed tube 62. The liquid lubricant from lubricant manifold 46 is supplied through axial passage 54 to radial passages 56. The lubricant flows through radial passages 56 into the distribution recess 58 between the journal pin 120 and the star gear 38. The distribution recess 58 may extend along the outer radial surface (i.e., interface surface 52) of journal pin 120. The liquid lubricant forms a film of lubrication (a "lubrication film") on the journal pin in the distribution recess 58. From distribution recess 58, the lubricant film spreads circumferentially and axially due to viscous forces between star gear 38 and journal pin 120. The lubricant film helps to support star gear 38 and reduce friction between inner surface 60 of star gear 38 and interface surface 52 of the journal pin as the star gear 38 rotates.

End caps 50 are welded or otherwise affixed to journal bearing 44 and press fit into gear carrier 48. End caps 50 and gear carrier 48 provide support for journal bearing 44. Fasteners extend through end caps 50 and connect to gear carrier 48 to act as an anti-rotation feature to keep journal pin 120 and journal bearing 44 stationary (i.e., static).

To substantially ensure that a minimum lubricant film thickness is maintained during gas turbine engine operation, the lubricant film thickness between the interface surface 52 of the journal pin 120 and the inner surface 60 of the star gear 38 may be monitored according to systems and methods according to various embodiments as described herein. It is desirable to monitor the lubricant film thickness in real time to substantially ensure that the lubricant thickness is not zero or some value very near zero and preferably, that the lubricant thickness is at least the predetermined minimum lubrication film thickness (e.g., predetermined required lubrication film thickness) and that there is no touchdown between interface surface 52 and inner surface 60 (the "interfacing bearing surfaces") 52 of star gear. The interface surface 52 of journal pin 120 may be provided with a minimum lubricant film thickness of between about 0.00254 mm (100 micro inches) and 0.0508 mm (2000 micro inches). Of course, the minimum lubricant film thickness may be set at any level.

As further shown in FIG. 2, journal bearing 44 extends radially outward from an axis of symmetry that generally aligns with axial passage 54 to outermost interface surface 52. The star gear 38 has the inner surface 60 that extends parallel to interface surface 52 of journal bearing 44. More particularly, inner surface 60 runs against interface surface 52 as star gear 38 rotates. The lubricant film spreads circumferentially and axially in a boundary regime between interface surface 52 and inner surface 60 from distribution recess 58 due to viscous forces between star gear 38 and the journal pin. After forming the lubricant film between the journal pin and star gear 38, lubricant is discharged from the axial extremities of the bearing interface. Substantially all the discharged lubricant is directed into the sun/star mesh. The directed lubricant cools and lubricates the sun and star gear teeth and then is expelled from the sun/star mesh. The lubricant is eventually ejected from the star/ring mesh and centrifugally channeled away from epicyclic gear system 36.

Referring again to FIGS. 4 and 5, the gear trains suitable for use in the epicyclic gear system of the aircraft gas turbine engine are depicted, according to various embodiments. As noted previously, the gear trains each include the sun gear 42 driven by the low pressure shaft 18, the ring gear 40 radially outboard of the sun gear and connected to the fan shaft 34, and the set of star gears 38 radially intermediate and meshing with the sun and ring gears. As noted previously, each star gear 38 circumscribes the journal pin 120 and the thin, replenishable film of lubricant occupies the distribution recess 58 (FIG. 2) between each star gear 38 and its journal pin 120 to support the star gear.

Referring now specifically to FIG. 4 in which the epicyclic gear train is configured as the star gear system 37a, the sun and ring gears are each rotatable about an axis 128. The gear carrier 48 is non-rotatable even though the individual star gears 38 are each rotatable about their respective axes 130. As seen best in FIG. 4, the input and output shafts counter-rotate. Lubricant flows through the star gear system to support the star gears 38 on the journal pins 120 and to lubricate and cool the gear teeth.

Referring now to FIG. 5, the gear train of the epicyclic gear system 36 can alternatively be configured in a different manner sometimes called the planetary gear system 37b as noted previously. In this configuration, the star or "planet" gear 38 is rotatably mounted on the gear carrier 48 by the journal pin 120. Star gears 38 mesh with sun gear 42. Mechanically grounded (i.e., non-rotatable), internally toothed ring gear 40 circumscribes and meshes with star gears 38. Input and output shafts extend from sun gear 42 and the gear carrier 48 respectively. During operation, the input shaft rotatably drives sun gear 42, rotating star gear 38 about its own star gear axis 130, and because ring gear 40 is mechanically grounded, causes star gear 38 to orbit the sun gear 42 in the manner of a planet. Orbital motion of star gear 38 turns the gear carrier 48 and the output shaft in the same direction as the input shaft. Whether the gear train of the epicyclic gear system is configured as a star gear system 37a or a planetary gear system 37b, it is desirable to monitor the lubricant film thickness in real time or near real time during gas turbine engine operation.

Figure 3:
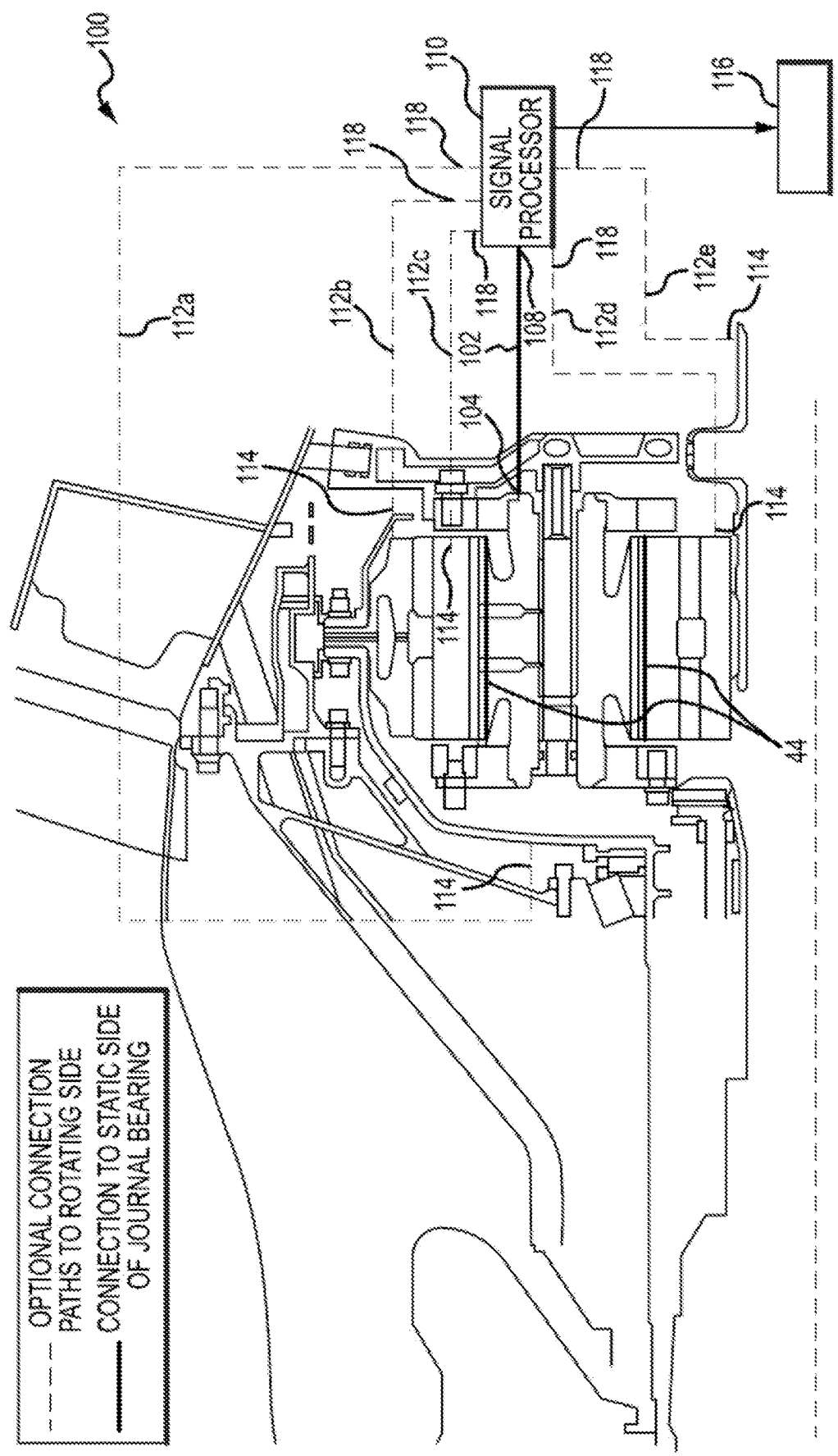
FIG. 3 is another schematic cross sectional side view of a portion of the aircraft gas turbine engine of FIG. 1, illustrating a system for monitoring the lubricant film thickness of a journal bearing in the epicyclic gear system thereof, according to various embodiments.

Still referring to FIGS. 4 and 5 and now to FIG. 3, according to various embodiments, a system 100 for monitoring the lubricant film thickness of a journal bearing 44 in the epicyclic gear system is depicted. The system 100 comprises one or more conductive elements in electrical communication with a signal processor 110 to detect the lubricant film thickness.

According to various embodiments, the system 100 comprises a first electrical lead (solid line 102) having a first end 104 in communication with a first conductive element (e.g., journal pin 120 in FIGS. 3 through 5) on a static side of the journal bearing 44 and a second end 108 connected to a signal processor 110 as hereinafter described. A second electrical lead (dotted lines 112a, 112b, 112c, 112d, and 112e) representing alternative connection paths for the second electrical lead as hereinafter described) has a first lead end 114 connected to a second conductive element as hereinafter described on a rotating side of the journal bearing 44 and a second lead end 118 of the second electrical lead 112a, 112b, 112c, 112d, or 112e is connected to the signal processor 110 to complete the electrical circuit. More specifically, in the epicyclic gear system configured as a star gear system 37a (e.g., FIG. 4), the first conductive element on the static side of the journal bearing 44 may be the journal pin 120 as noted previously. The second conductive element on the rotating side of the journal bearing 44 may comprise, for example, a star gear 38, the ring gear 40, the sun gear 42, the input coupling, or the fan shaft 34. Therefore, the second lead end 118 of second electrical lead (dotted line 112a) is depicted as connected to fan shaft 34. The second lead end of second electrical lead (dotted line 112b) is depicted as connected to sun gear, dotted line 112c is connected to star gear, dotted line 112d is connected to ring gear, and dotted line 112e is connected to input coupling.

Still referring to FIG. 3 and now to FIG. 5 depicting the epicyclic gear train configured as a planetary gear system, according to various embodiments, the first end 104 of the first electrical lead (solid line A) is connected to the first conductive element (e.g., the journal pin 120) on a static side of the journal bearing and the second end is connected to the signal processor 110 as noted previously. The first lead end 114 of the second electrical lead may be connected to the second conductive element on the rotating side of the journal bearing 44 and the second lead end 118 of the second electrical lead is connected to the signal processor 110 as noted previously, in order to complete the electrical circuit. Thus, the first lead end 114 of the second electrical lead in the planetary gear system may be connected to a star gear 38 or the ring gear 40 as depicted in FIG. 5.

The signal processor may be used for measuring electrical properties across the lubricant film (from the static side of the journal bearing 44 to the rotating side of the journal bearing 44), between the first electrical lead 102 and the second electrical lead 112. In various embodiments, an electrical measuring device may be separate from the signal processor 110. The measured electrical properties include bearing resistance, bearing capacitance, capacitive reactance, impedance, and combinations thereof. The signal processor is electrically connected with the first electrical lead 102 and the second electrical lead 112.

The electrical property (e.g., bearing resistance and/or bearing capacitance) across the lubricant film is measured to obtain an electrical property measurement using the signal processor 110. In various embodiments, the signal processor 110 may be in electrical communication with a Wheatstone bridge or other circuitry in order to detect the electrical property measurement. The signal processor 110 is configured to generate a lubricant film thickness from the electrical property measurement. More specifically, the signal processor 110 is configured to compare the electrical property measurement with a reference measurement for the electrical property. The signal processor 110 is configured to detect contact of the bearing surfaces if the electrical property measurement comprising a bearing resistance is about zero ohms. The signal processor is further configured to convert the electrical property measurement into a lubricant film thickness measurement. Using known equations, the signal processor 110 converts the electrical property measurement into the lubricant film thickness measurement. The lubricant film thickness may be calculated from, for example, bearing capacitance or bearing resistance and other enumerated values such as, for example, shaft diameter, the shaft length to diameter ratio, the shaft eccentricity ratio, and the permittivity/dielectric constant of the lubricant. A calculated lubricant film thickness corresponding to the real-time lubricant film thickness may be determined. The real-time lubricant film thickness may similarly be determined with a bearing resistance measurement and other enumerated values such as shaft diameter, length to diameter ratio, eccentricity ratio, resistivity of the lubricant, etc. as known in the art.

The signal processor 110 is further configured to compare the calculated lubricant film thickness measurement with a predetermined minimum lubricant film thickness value. If the calculated lubricant film thickness is less than the predetermined minimum lubricant film thickness, a touchdown of the bearing surfaces may be occurring, necessitating journal bearing maintenance. In response to receiving a signal that the calculated lubricant film thickness is less than the predetermined minimum lubricant film thickness, the signal processor 110 is further configured to generate a signal to an engine control unit 116 such as a full authority digital engine control (FADEC) or an Electronic Centralized Aircraft Monitor (ECAM), according to various embodiments. The signal processor may be in communication with the FADEC or ECAM of the aircraft. As used herein the term "signal processor" may refer to a portion or module of an engine control unit (e.g., FADEC, ECAM) or to a standalone controller in communication with an engine control unit (e.g., FADEC, ECAM). The output signal from the signal processor 110 to the engine control unit 116 may represent an alert. The output signal representing the alert/inadequate lubricant film thickness may then be relayed to, for example, ground maintenance crews for investigation into the loss of lubricant film thickness. In various embodiments, and as described in greater detail below with reference to FIG. 6, if the lubricant film thickness is substantially lost such that substantially no resistance is measured across the lubricant film, the engine control module may trigger an alert such as a cockpit light, permitting safe shutdown of the gas turbine engine. In various embodiments, and as described in greater detail below with reference to FIG. 7, instead of or in addition to triggering an alert, the signal processor 110 and/or the engine control unit 116 may restrict a subsequent restart of the gas turbine engine.

Figure 6:
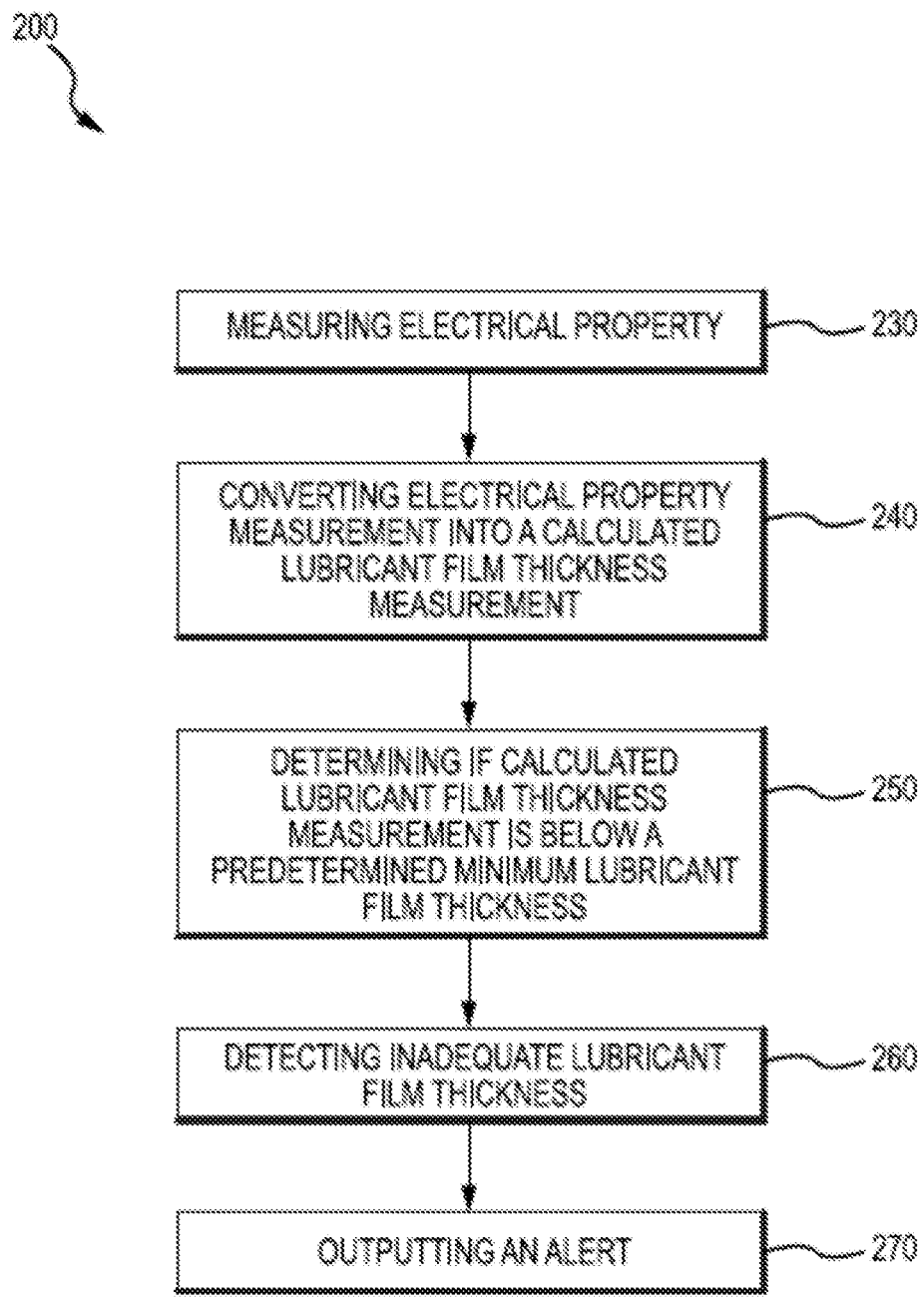
FIG. 6 is a schematic flow chart diagram of a method for monitoring the lubricant film thickness of a journal bearing in an epicyclic gear system of a gas turbine engine, according to various embodiments.

Referring now to FIG. 6, according to various embodiments, a method 200 for monitoring lubricant film thickness between bearing surfaces of a journal bearing in an epicyclic gear system of a gas turbine engine begins by measuring the electrical property across the lubricant film (step 230). The lubricant film thickness may be determined through use of the signal processor comprising a Wheatstone bridge or other circuitry that measures electrical properties such as bearing resistance, bearing capacitance, capacitive resistance, impedance, and combinations thereof across the film thickness, as hereinafter described.

The method 200 for monitoring the lubricant film thickness of the journal bearing continues by converting the electrical property measurement into a calculated lubricant film thickness (step 240). The calculated lubricant film thickness may be calculated by a mathematical equation that relates the electrical property measurement to the real-time minimum lubricant film thickness.

The method 200 for monitoring the lubricant film thickness of the journal bearing continues by determining whether the calculated lubricant film thickness is below the predetermined minimum lubricant film thickness threshold (step 250). Determining whether the calculated lubricant film thickness is below the predetermined minimum lubricant film thickness threshold comprises comparing the calculated minimum lubricant film thickness with the predetermined minimum thickness threshold.

The method 200 for monitoring the lubricant film thickness of the journal bearing continues by detecting an inadequate lubricant film thickness if the calculated lubricant film thickness is below the predetermined minimum thickness (step 260).

The method for monitoring the lubricant film thickness of the journal bearing continues by sending an output signal representing an alert from the signal processor to the engine control module such as the FADEC or the ECAM of the gas turbine engine (step 270) if the calculated lubricant film thickness is below the predetermined minimum thickness.

Figure 7:
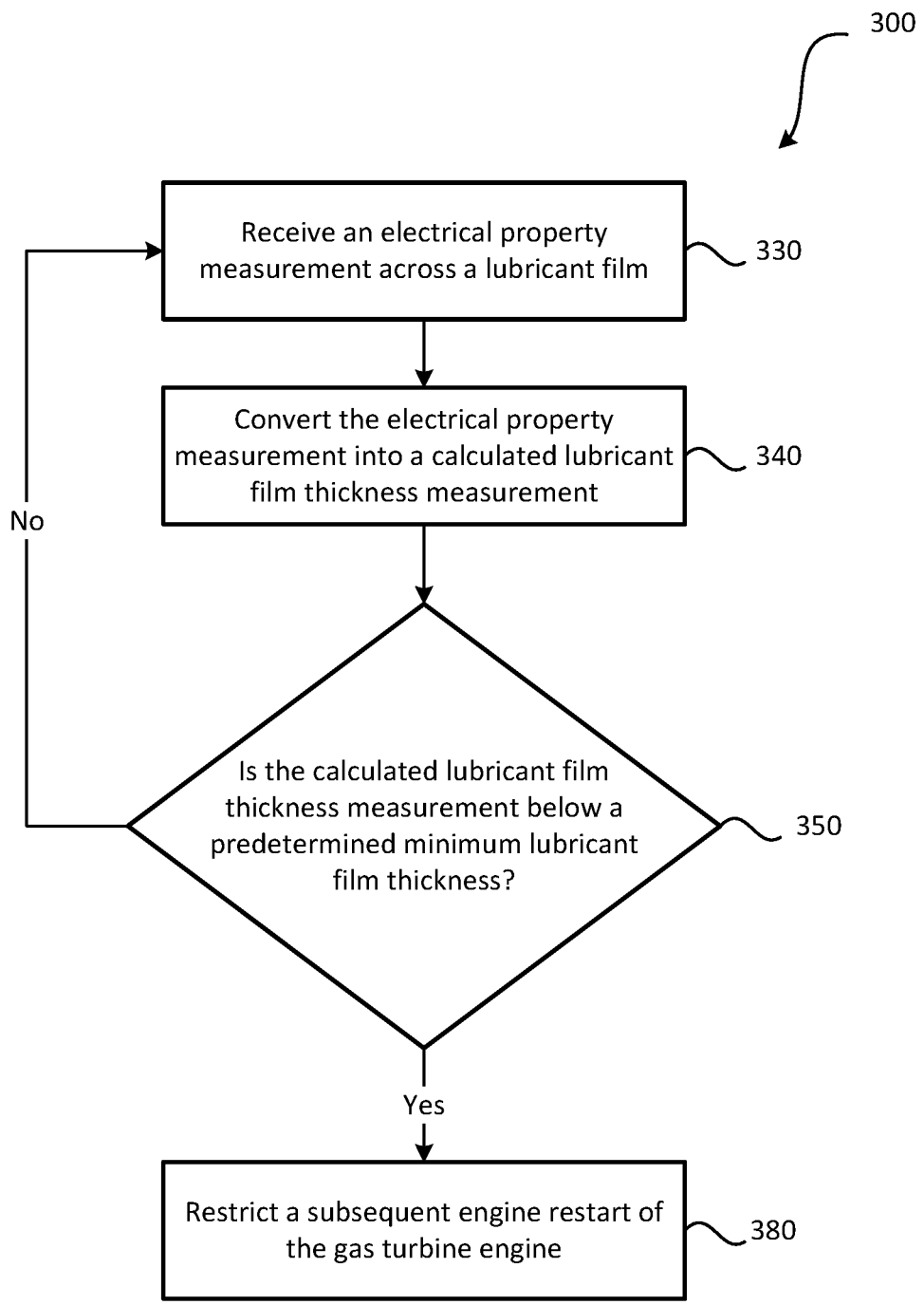
FIG. 7 is a schematic flow chart diagram of a method for controlling a gas turbine engine in response to a thickness of a lubricant film in a journal bearing of an epicyclic gear system of the gas turbine engine, according to various embodiments.

In various embodiments, and with reference to FIG. 7, a method 300 for controlling the gas turbine engine in response to a thickness of a lubricant film in a journal bearing of an epicyclic gear system of the gas turbine engine is provided. The method 300 may include, similar to method 200 and as described extensively above, receiving an electrical property measurement across a lubricant film at step 330 and converting the electrical property measurement into a calculated lubricant film thickness measurement at step 340. The method 300 may further include the signal processor and/or engine control unit, in response to determining the calculated lubricant film thickness measurement is below the predetermined minimum lubricant film thickness at step 350, restricting a subsequent restart of the gas turbine engine at step 380. Said differently, the signal processor and/or the engine control unit may, instead of or in addition to indicating an alert, restrict, limit, prevent, or otherwise affect the next restart of the gas turbine engine. For example, instructions may be stored on a memory of the signal processor and/or the engine control unit that affect the next restart of the gas turbine engine. In such embodiments, the aircraft may safely complete the flight during which the inadequate lubricant film thickness is detected, but subsequent flights may be restricted or may be otherwise limited until the lubricant film thickness issue has been resolved or at least addressed (e.g., until a maintenance action is performed).

In various embodiments, the step of restricting the subsequent engine restart of the gas turbine engine (step 380) comprises preventing subsequent restart. That is, the engine may be prevented from being restarted until the inadequate lubricant film thickness issue has been resolved or at least addressed. In various embodiments, step 380 includes limiting a subsequent operating state of the gas turbine engine. That is, step 380 may include preventing the gas turbine engine from operating at elevated speeds. For example, the aircraft may be prevented from operating above idle after the subsequent restart until the lubricant film thickness issue has been resolved.

While monitoring the lubricant film thickness of journal bearings has been described, it is to be understood that the lubricant film thickness of rolling element bearings, gear boxes, and gear meshes that rely on maintaining a minimum lubricant film thickness between bearing surfaces may benefit from various embodiments as described herein. It is to be appreciated that the systems and methods for monitoring lubricant film thickness according to various embodiments of the present disclosure minimize gear system and engine failure, thereby resulting in improved performance and operability.

Figure 8:
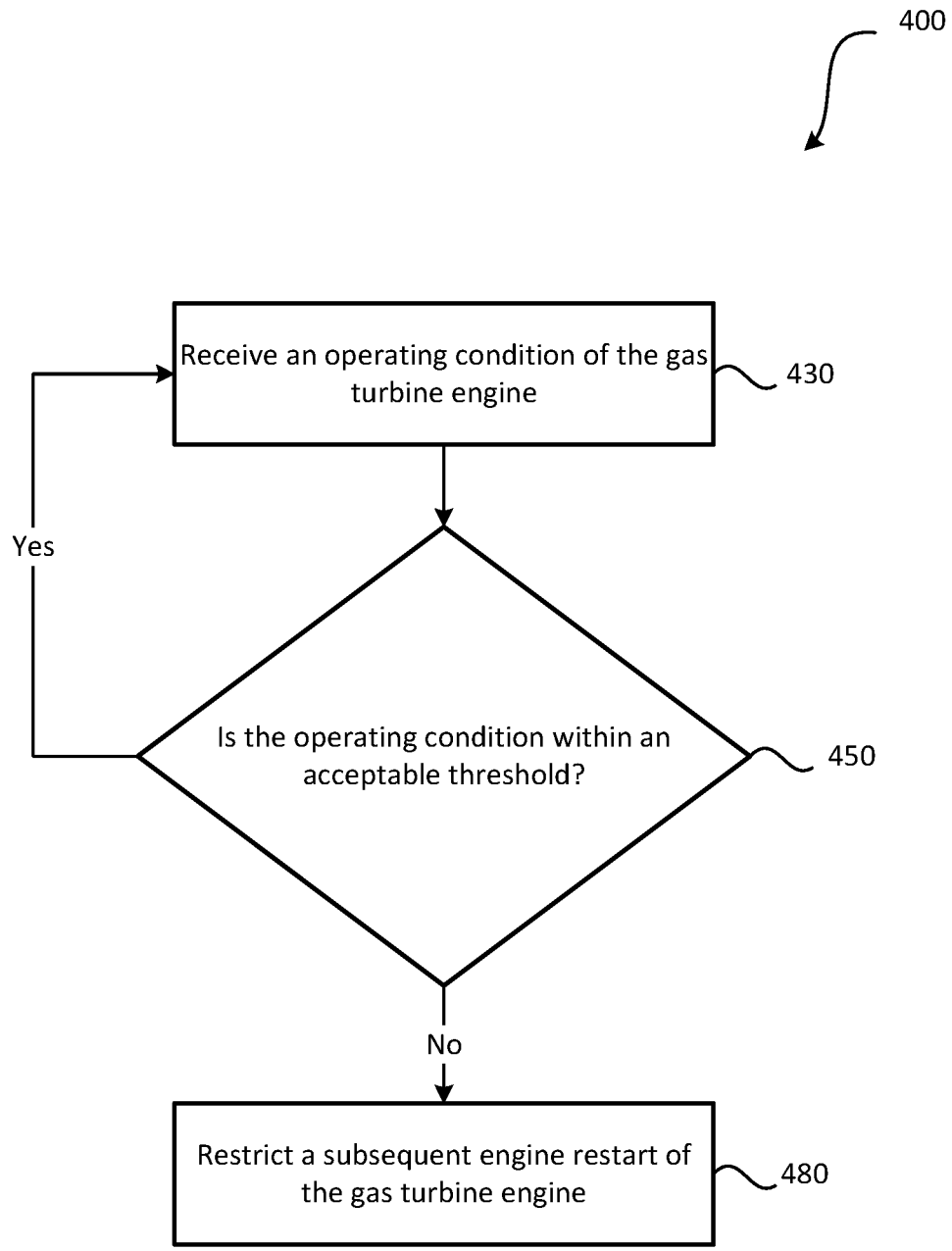
FIG. 8 is a schematic flow chart diagram of a method for controlling a gas turbine, according to various embodiments.

In various embodiments, and with reference to FIG. 8, a method 400 for controlling the gas turbine engine is provided. The method 400 may include receiving, via signal processor from a sensor, an operating condition of the gas turbine engine at step 430. The operating condition 430 may include a parameter detected from a sensor. The method 400 may further include determining whether the operating condition is within an acceptable threshold at step 450. In response to the operating condition being outside the acceptable threshold, the signal processor and/or the engine control until may restrict a subsequent restart of the gas turbine engine at step 480. Said differently, the signal processor and/or the engine control unit, instead of or in addition to only indicating an alert pertaining to the detected operating condition, may restrict, limit, prevent, or otherwise affect the next restart of the gas turbine engine. For example, instructions may be stored on a memory of the signal processor and/or the engine control unit that affect the next restart of the gas turbine engine. In such embodiments, the aircraft may safely complete the flight during which the inadequate lubricant film thickness is detected, but subsequent flights may be restricted or may be otherwise limited until the lubricant film thickness issue has been resolved or at least addressed (e.g., until a maintenance action is performed).

In various embodiments, the step of restricting the subsequent engine restart of the gas turbine engine (step 480) comprises preventing subsequent restart. That is, the engine may be prevented from being restarted until the inadequate lubricant film thickness issue has been resolved or at least addressed. In various embodiments, step 480 includes limiting a subsequent operating state of the gas turbine engine. That is, step 480 may include preventing the gas turbine engine from operating at elevated speeds. For example, the aircraft may be prevented from operating above idle after the subsequent restart until the lubricant film thickness issue has been resolved.

The operating condition received/detected at step 430 of the method 400 may be a temperature from a temperature sensor, a pressure from a pressure sensor, a position from a position sensor, a vibratory response from a vibration sensor, a rotating speed from a speed sensor, a lubricant thickness from a lubricant film thickness sensor, and/or a sensor status (e.g., a status indicating a failed sensor). For example, the operating condition may be an exhaust gas temperature, a compressor exit temperature, a main lubricant temperature, a total temperature at the turbine exit, and/or a fan turbine inlet temperature. In various embodiments, the operating condition may be a main oil pressure, a fuel pressure, an oil filter pressure differential, a fuel filter pressure differential, an accessory oil pressure, and/or an engine pressure ratio. In various embodiments, the operating condition may be a thrust reverser door position, a fuel metering valve position, an exhaust nozzle position, a compressor variable vane position, and/or an oil tank level. In various embodiments, the operating condition may be a fan shaft overspeed, a high rotor overspeed, and/or a low rotor overspeed.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling a gas turbine engine in response to a thickness of a lubricant film in a journal bearing of an epicyclic gear system of the gas turbine engine, the method comprising:

receiving, from an electrical circuit by a signal processor from a sensor, an electrical property measurement across the lubricant film, wherein the electrical property measurement is taken across a bearing interface of the journal bearing, wherein the electrical property measurement taken across the bearing interface is taken between an interface surface of a journal pin and an inner surface of a star gear, wherein the inner surface of the star gear extends parallel to the bearing interface of the journal bearing, and wherein the measurement further comprises bearing resistance;

detecting, by the signal processor, contact of the bearing surfaces if the electrical property measurement is zero;

converting, by the signal processor, the electrical property measurement into a calculated lubricant film thickness measurement;

determining, by the signal processor, whether the calculated lubricant film thickness measurement is at or near zero or below a predetermined minimum lubricant film thickness; and in response to at least one of the calculated lubricant film thickness measurement being below the predetermined minimum lubricant film thickness and detecting contact of the bearing surfaces, restricting, by the signal processor, a subsequent engine restart of the gas turbine engine.

2. The method of claim 1, further comprising comparing the electrical property measurement with a reference measurement for the electrical property.

3. The method of claim 1, wherein converting the electrical property measurement into the calculated lubricant film thickness measurement comprises calculating the calculated lubricant film thickness measurement from the electrical property measurement.

4. A system for controlling a gas turbine engine in response to a thickness of a lubricant film in a journal bearing of an epicyclic gear system of the gas turbine engine, the system comprising:

the epicyclic gear system, wherein the epicyclic gear system comprises a sun gear driven by a first shaft of the operating gas turbine engine, a ring gear connected to a fan shaft of the operating gas turbine engine, and a set of star gears radially intermediate and meshing with the sun gear and the ring gear, wherein a journal pin is disposed inside a first star gear of the set of star gears and is connected to a gear carrier, wherein the first star gear rotates relative to the journal pin to define a bearing interface between the journal pin and the first star gear, and wherein the ring gear rotates relative to the first star gear to define a gear mesh between the first star gear and the ring gear;

a first electrical lead having a first end in communication with a first conductive element on a static side of the journal bearing and a second end connected to a signal processor, wherein the first conductive element comprises the journal pin or the gear carrier;

a second electrical lead having a first lead end connected to a second conductive element on a rotating side of the journal bearing and a second lead end connected to the signal processor to complete an electrical circuit, wherein the second conductive element comprises the ring gear or the fan shaft, wherein the signal processor is electrically connected to the first electrical lead and the second electrical lead, the signal processor configured to:
- measure an electrical property of the electrical circuit to obtain an electrical property measurement, wherein the electrical property measurement is taken across both the bearing interface and the gear mesh, wherein the electrical property measurement taken across the bearing interface is taken between an interface surface of the journal pin and an inner surface of the first star gear, wherein the inner surface of the first star gear extends parallel to the bearing interface of the journal bearing;
- compare the electrical property measurement with a reference measurement for the electrical property and detect contact of bearing surfaces if the electrical property measurement comprising a bearing resistance is zero;
- convert the electrical property measurement into a calculated lubricant film thickness measurement;
- compare the calculated lubricant film thickness measurement with a predetermined minimum lubricant film thickness; and
- restrict a subsequent engine restart of the gas turbine engine if at least one of the calculated lubricant film thickness measurement is less than the predetermined minimum lubricant film thickness and bearing surface contact is detected,
- wherein restricting the subsequent engine restart of the gas turbine engine comprises at least one of preventing the subsequent engine restart, limiting a subsequent operating state of the gas turbine engine to an operating speed of the gas turbine engine after the subsequent restart, and preventing the gas turbine engine from operating above idle after the subsequent engine restart.

5. The system of claim 4, wherein the first conductive element on the static side of the journal bearing comprises the journal pin.

6. The system of claim 4, wherein the second conductive element on the rotating side of the journal bearing the fan shaft.

7. The system of claim 4, wherein the electric property measurement comprises at least one of bearing resistance, bearing capacitance, capacitive reactance, or impedance.

8. A method for controlling a gas turbine engine in response to a thickness of a lubricant film in a journal bearing of an epicyclic gear system of the gas turbine engine, the method comprising:
- receiving, from an electrical circuit by a signal processor from a sensor, an electrical property measurement across the lubricant film, wherein the electrical property measurement is taken across a bearing interface of the journal bearing wherein the measurement further comprises bearing resistance;
- detecting, by the signal processor, contact of the bearing surfaces if the electrical property measurement is zero;
- converting, by the signal processor, the electrical property measurement into a calculated lubricant film thickness measurement;
- determining, by the signal processor, whether the calculated lubricant film thickness measurement is at or near zero or below a predetermined minimum lubricant film thickness; and
- in response to at least one of the calculated lubricant film thickness measurement being below the predetermined minimum lubricant film thickness and detecting contact of the bearing surfaces, restricting, by the signal processor, a subsequent engine restart of the gas turbine engine,
- wherein restricting comprises at least one of limiting a subsequent operating state of the gas turbine engine to an operating speed of the gas turbine engine after the subsequent restart and preventing the gas turbine engine from operating above idle after the subsequent engine restart.

\* \* \* \* \*